United States Patent [19]
Hell et al.

[11] 3,710,019
[45] Jan. 9, 1973

[54] METHOD AND APPARATUS FOR DETERMINING DATA TO BE USED BY ELECTRONIC PHOTO-TYPESETTING DEVICES

[75] Inventors: Rudolf Hell, Kiel; Roman Koll, Kiel-Wellingdorf; Ewald Lifferth, Kiel-Kronshagen, all of Germany

[73] Assignee: Dr. Ing. Rudolf Hell Kommandit-gesellschaft

[22] Filed: Aug. 10, 1970

[21] Appl. No.: 62,487

[30] Foreign Application Priority Data

Aug. 11, 1969 Germany....................P 19 40 797.7

[52] U.S. Cl...................................................178/7.6
[51] Int. Cl...............................................H04n 1/10
[58] Field of Search...................................178/6, 7.6

[56] References Cited

UNITED STATES PATENTS 3,497,610 2/1970 Langberg et al...................178/7.6 X
1,176,148 3/1916 Keen...............................178/7.6 X
3,465,145 9/1969 Leiter..............................178/6 X

*Primary Examiner*—Howard W. Britton
*Attorney*—Hill, Sherman, Meroni, Gross & Simpson

[57] ABSTRACT

Data for setting italic characters by electronic photo-typesetting devices is determined by reciprocating an original card containing the italic character and a scanning head adapted for measuring light and dark markings relative to one another and along a linear path inclined from the vertical by an angle equal to the angle of inclination of the italic character. After the completion of each back and forth scanning cycle, the original character card and the scanning head are relatively, horizontally displaced by an incremental amount to position the card and the head for a subsequent scanning cycle.

6 Claims, 5 Drawing Figures

PATENTED JAN 9 1973 3,710,019

SHEET 1 OF 3

INVENTOR.
Rudolf Hell
Roman Koll
Ewald Lifferth

BY Hill, Sherman, Meroni, Gross & Simpson ATTORNEYS

INVENTOR.
Rudolf Hell
Roman Koll
Ewald Lifferth

BY Hill, Sherman, Meroni, Gross & Simpson ATTORNEYS

INVENTOR.
Rudolf Hell
Roman Koll
Ewald Lifferth

BY Hill, Sherman, Meroni, Gross & Simpson
ATTORNEYS

METHOD AND APPARATUS FOR DETERMINING DATA TO BE USED BY ELECTRONIC PHOTO-TYPESETTING DEVICES

BACKGROUND OF THE INVENTION

1. Field of the Invention

The present invention generally relates to electronic photo-typesetting devices, and more particularly refers to a method of, and an apparatus for, determining data for use in setting italic characters by means of electronic photo-typesetting devices.

2. Description of the Prior Art

In electronic photo-typesetter operating according to the raster method, a selected character or indicia to be set is projected on a cathode ray tube by an electron beam scanned over the tube, and the luminous character produced on the cathode ray tube is projected onto a photo-sensitive surface. Electronic control means regulate the voltages for controlling the brightness and deflection of the electron beam in a manner to reproduce the selected character from data stored in the control means. That control data is determined in an earlier, independent operation by photo-electrically scanning a greatly magnified, graphic character original which is drawn on a character original card divided into equal areas by network of raster lines. During the photo-electric scanning operation, an electro-optical scanning head adapted for measuring black and white or light and dark markings scans the character original card and allocates a binary number to each sensed black or white line portion or area, thereby producing control data which is stored for later retrieval and used to reproduce the recorded or scanned character.

During the reproduction of the characters, the electron beam traces vertical picture lines on the cathode tube. The beam is controlled by the stored data in a manner to form light or dark points or line segments arranged in a manner to form a luminous picture on the screen of the cathode ray tube, which picture corresponds to the selected character.

The characters or indicia, which are usually utilized in photo-typesetting operations, are vertically aligned so that there general direction and thus the predominant number of contour lines, extends vertically. It is also desirable to provide a method and apparatus for setting characters or lettering which deviate from the vertical, so-called "italic lettering." The general direction of the contours of italic lettering slope towards the right at an angle in the range of 10° to 20° from a vertical direction.

Heretofore, with the aid of the photo-typesetting device, characters which are normally vertically aligned may be recorded at an angle. For that purpose, a certain percentage of the vertical deflecting current is applied to the horizontal deflection coil. However, such "imitated" italic characters, which are formed by skewing normal vertical characters, do not meet the exacting requirements of some persons in the graphic arts field. True italic lettering or characters differ from the normal vertical characters not only in their inclined position but also in their shape and style.

Although the originals of proper or true italic characters may be scanned, like vertically aligned characters, in vertical directions and recorded from the data obtained by the vertical scanning, such reproduced italic characters may not be satisfactory for all applications.

Each contour of a character extending at an angle inclined relative to the scanning direction during the data recording operation is reproduced on the cathode ray tube screen as a stepped line. With rounded portions of the character contours and the oblique edges which deviate by large angles from the recording or scanning direction, that stepped line structure of the reproduced character is not readily conspicuous. First, the picture element produced on the screen and recorded on the photo-sensitive surface is very small compared with the original character, and thus, may be at the limit of possible definition by the human eye. Also, since the stepped edges are rounded off due to the circular shape of the projected beam and the effects of halation of the photographic material, those stepped edges may not present a significant problem.

However, with straight or substantially straight contours, which are inclined from the scanning or recording direction by a slight angle, the stepped stages or lines have a relatively long length. Thus, the stepped structure or lines may be clearly recognizable and, therefore, produce a distorted character. Such slightly inclined contours frequently occur with italic or slanted characters or lettering.

One method for avoiding the undesirable, stepped contours of reproduced italic characters includes projecting the original of the italic character at an inclination to a normal character, i.e., a character having preferably vertical contours "skewed" on an original character. That second character original is used for obtaining the control data by means of a scanning device oriented at right angles. Back skewing into the natural inclined position according to the original character is then effected by a photo-type setting operating in a manner known per se by superposing the vertical with horizontal deflection of the recording beam proportional to this latter.

Although this method is accurate, it has the disadvantage of being very costly and time consuming. Moreover, it is not possible, or only very difficult indeed, for the type former or caster to judge correctly the shape of the skewed original of the italic character.

SUMMARY OF THE INVENTION

In accordance with the present invention, the defects of the prior art are remedied by reciprocating the character original card and an electro-optical scanning head adapted for measuring light and dark or black and white markings on the original card relative to one another in such a manner that the relative direction of movement is along a line inclined from the vertical by an angle equal to the angle of inclination of the italic character with respect to a vertical edge of the original card. After each back and forth movement or reciprocating cycle, the original card and the scanning head are relatively displaced in a horizontal direction by an incremental amount.

One form of an apparatus for practicing the present invention includes a scanning head mounted for incremental movements in a horizontal direction and being fixed in the vertical direction. The character original card is mounted on a frame work which is driven in both the vertical and the horizontal directions in a manner to move along a path inclined from the vertical by an angle equal to the angle of inclination of the italic character.

Another form of the present invention contemplates mounting the character original card on a frame work, which in turn is mounted for movement only in the horizontal direction. The scanning head for that form of the invention is mounted for movement along a linear path inclined from the vertical direction.

BRIEF DESCRIPTION OF THE PREFERRED EMBODIMENTS

Figure 1B:
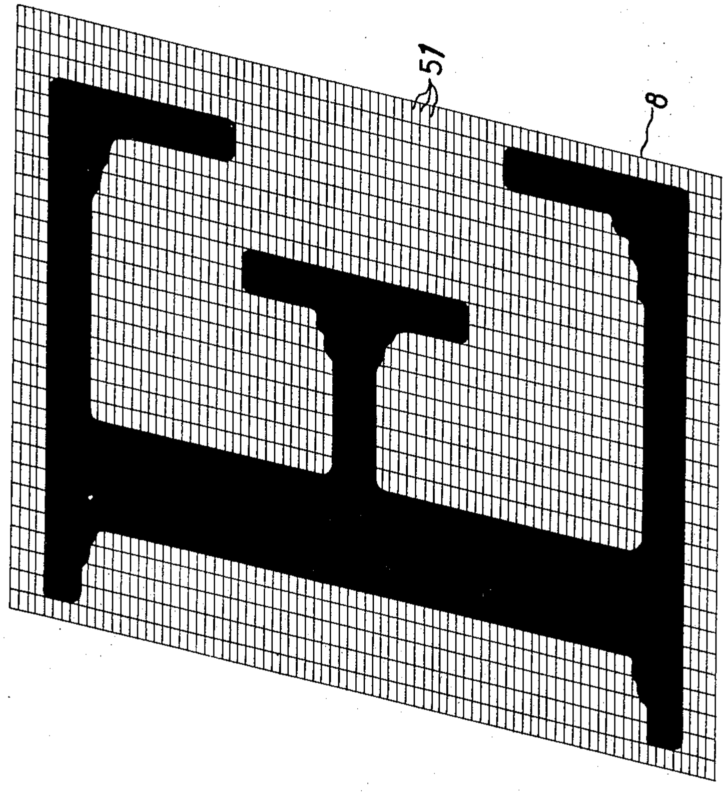
FIG. 1*b* illustrates an original card, bearing an italic character, for use with the apparatus and method of the present invention.

Referring to the drawings, a character original card 8 contains an italic character or letter E. The card 8 and the character contained thereon are conformed in size and scale to the raster network of a particular scanning device which operates at right angles and which is to be utilized with the card. During the scanning operation, an electro-optical scanning head scans the lines of the picture or character contained on the card in a generally vertically, upwardly direction. The scanning path extends centrally between a pair of adjacent, vertical raster networks lines. The groupings of white and black areas or steps defined by the raster network lines are counted and assigned a code or binary number position which is then electronically stored for later use to reproduce the character.

Figure 1A:
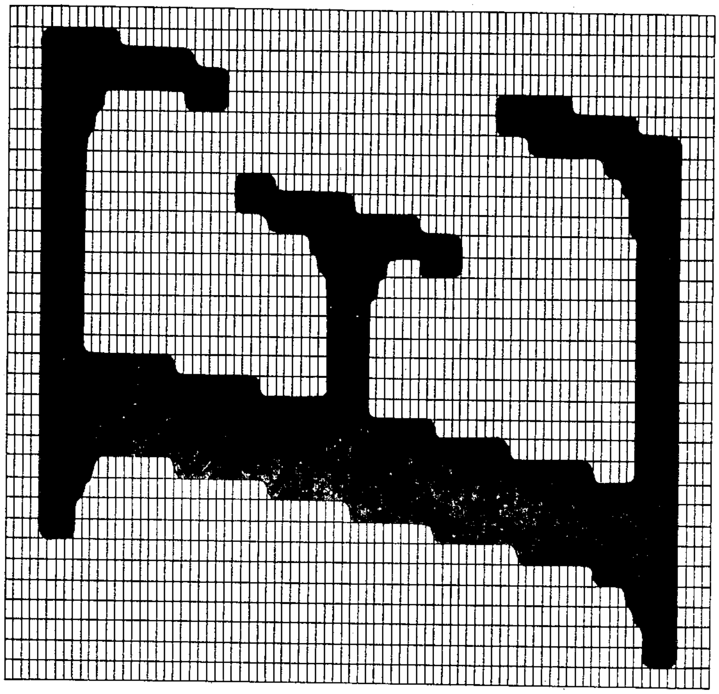
FIG. 1*a* illustrates a reproduced italic character having an imitated, stepped structure.

An italic character, originally scanned for data acquisition and rerecorded by a photo-typesetting device, has the stepped-appearance, as illustrated in FIG. 1*a*. The aforementioned imitated, stepped structure of the inclined, general contour direction of the italic character is clearly apparent in the drawing.

In accordance with the principles of the present invention, the italic character is scanned and reproduced in the direction of inclination of the italic, thereby producing a reproduced or recorded character which has smooth, straight contours along the direction of the inclination, as illustrated in FIG. 1*b*. When the characters are printed at a size substantially reduced relative to the scale of the original, the steps as illustrated in FIG. 1*a*, become indistinguishable to the eye. However, the overall impression which the reader gets with the character scanned and reproduced in accordance with the present invention is essentially better than that illustrated in FIG. 1*a*.

In order to obtain the data for recording the character, the light spot of the electro-optical head must assume a central path between a pair of adjacent, inclined raster field lines. The data thus obtained are then stored for later retrieval in a manner to reproduce the character by the photo-typesetting operation.

In reproducing the character with the photo-setting device, the electron beam also must assume the same angle of inclination with respect to the horizontal during vertical deflection, in order to produce the character contours of the original, as illustrated in FIG. 1*b*. It is to be noted, therefore, that the height of the character, the so-called "body size" is not changed by the inclination. Extension of the contours extending at an angle, therefore, inevitably occurs due to the inclination. The numerical longitudinal division of the character is produced by the horizontal network lines, as at 51, which are spaced apart at the same intervals as utilized in a right angle or vertical scanning device.

Thus, in accordance with the present invention, the above-mentioned requirements are fulfilled if the scanning head, when scanning the original card 8, executes a movement which, in addition to the normal vertical movement, simultaneously executes a horizontal movement. That horizontal movement is of an amount equal to the product of the tangent of the angle $\gamma$ and the amount of the vertical movement, wherein $\gamma$ is the angle of inclination of the general direction or edge of the italic character with respect to the vertical direction.

Scanning movements which fulfill those requirements may be performed by one of two alternative embodiments of the apparatus of the present invention.

Figures 2, 2A:
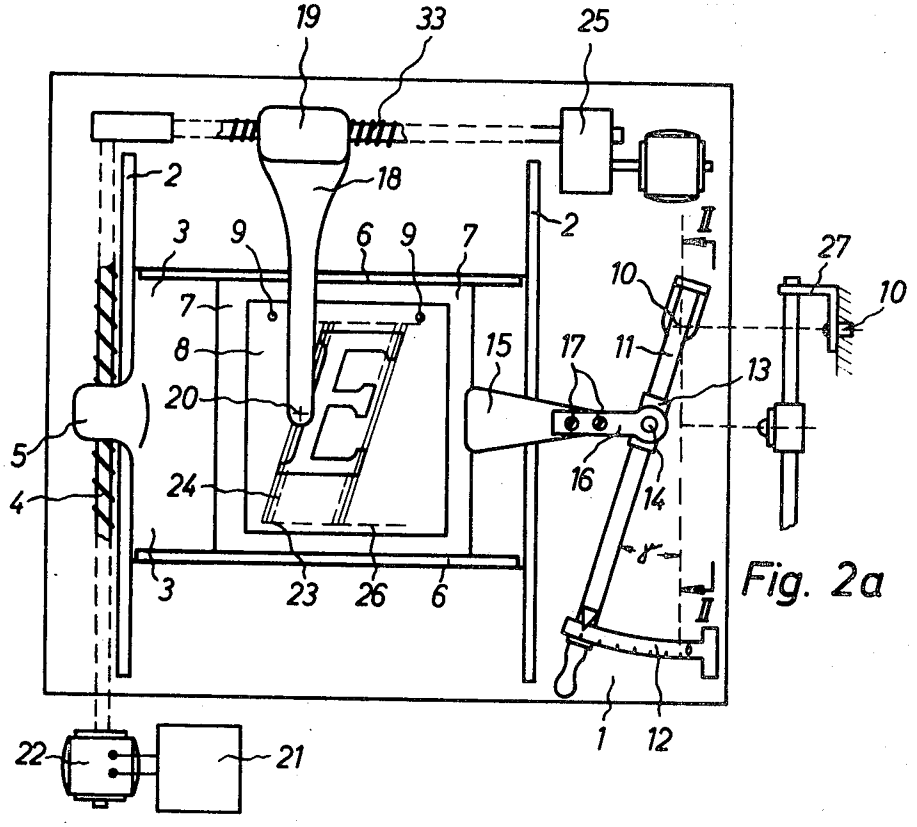
FIG. 2 is a diagrammatic plan view of a scanning apparatus embodying the principles of one form of the present invention.
FIG. 2*a* is a sectional view taken substantially along line II—II of FIG. 2.

One form of the present invention, as illustrated in FIG. 2, includes means mounting the character original card for movement along the desired, inclined path while the scanning head remains at rest or only moves in incremental steps in the horizontal direction.

A pair of parallel guide rails 2, 2, secured to a platform or bench 1 and aligned so as to be parallel to a ground plane, support a sliding table 3 on appropriate sliding bearings. Thus, the sliding table 3 is mounted for reciprocating movement forwardly and rearwardly in a vertical direction extending perpendicular to a horizontal, front edge of the bench. When utilized in the description of the present invention, "vertical" is not to be understood as referring to a direction in space, but is utilized in relationship to a character or original character card which is to be scanned and which is located in the plane of the bench 1. The sliding table 3 is forwardly and rearwardly moved by a reversible drive which rotates a course pitch screw or spindle 4. A connecting arm 5 attached to the sliding table 3 has a threaded through bore receiving the spindle, thereby to interconnect the sliding table with the screw for vertical movement between the rails 2 in response to rotation of the screw.

A second, smaller table or support platform 7 has the character original card 8 affixed thereto and is supported for movement in a horizontal direction. A pair of parallel guide rails 6 mounted on the sliding table 3 supports the upper and lower edges of the smaller sliding table 7 for sliding movement therebetween in the horizontal direction. The character original card 8, which has an italic letter E formed thereon, has apertures formed therein for receiving the dowel pins 9, thereby to accurately affix the card to the table for movement therewith.

Movement of the character original card 8 in the desired, inclined direction is guided by means including a side rail or rod 11 which is rotatable about an axis extending perpendicular to a plane containing the bench 1. The angle of disposition of the rail or rod 11 relative to a vertical direction is adjusted or selected to be equal to the angle of inclination of the italic character. A pivot pin 10 pivotally supports the guide rail 11. The guide rail 11 is clamped into the selected position by means of clamping screws or other suitable means.

A sleeve or sliding head 13 is slidingly received on the guide rail 11 and has a hinge pin 14 formed thereon and projecting at right angles to the rail. The smaller sliding table 7 is connected to the rail 11 via an arm 15 rigidly connected to the table and an adjustable flap 16 interconnecting the arm to the hinge 14. A pair of screws 17 passing through the flap 16 are received in a slot (not shown) formed in the arm 15, thereby to enable adjustment in the distance between the hinge pin 14 and the adjacent edge of the table 7.

An electro-optical scanning head 20, which is adapted to read the light and dark markings on the card 8, is supported above the sliding tables 3 and 7 on an arm 18. The arm 18 has a hub 19 formed with a threaded through bore receiving the screw shaft 33.

In operation, a motor 22 is operated in alternating directions of rotation by a switching control 21 so that the screw or spindle 4 reciprocates the sliding table downwardly from an upper position and back again. Preferably, the extent of vertical movement or lift is equal to the height of a character raster field of the character original card 8. Due to the distance traversed during the reciprocating motion, the screw 4 has a course pitch.

As the larger sliding table 7 is vertically reciprocated, the smaller sliding table 7 also executes a proportional horizontal movement of an amount dependent upon the angle of inclination of the rail 11. At the beginning of a vertical scanning cycle, which includes one complete vertical reciprocation, the smaller sliding table is disposed at an extreme right-hand position. As illustrated in FIG. 2, when the sliding table 3 is at its start position, a point 23, which is located on a scale or base line 26 near a lower edge of the character card, is directly below the scanning head 20. During the downwardly directed, vertical movement of the table 3, the table 7, and thus the original card 8, moves to the left as the sleeve 13 slides down the guide rail 11. Thus, the head 20 scans the character original card 8 along a line, indicated by the dotted line 14, in an upward direction. The return of both of the sliding tables 3 and 7 to their starting position, in an upward direction, from the left to the right, takes place without scanning. Before scanning the next picture line, the spindle 33 is rotated about a small angle by an appropriate drive gear means 25, thereby shifting or displacing the scanning head 20 to the right an incremental distance equal to the width of a picture line.

In accordance with the present invention, the horizontal spacing between the vertical or steep raster network lines, denoting the picture line width, correspond to the original or normal spacing. Thus, the horizontal steps or incremental distances through which the scanning head 20 moves are the same as that normally utilized.

As mentioned hereinabove, the angle of the italic character is adjusted by means of the guide rod 11, which is mounted for pivotal movement about the pivot point or shaft 10. In the event the pivot point formed by the pivot shaft 10 is positioned so as to be outside of the sliding range of the sleeve or head 13, then with each readjustment of the angle of the guide rod or rail 11, the length of the flap connection between the sliding head or sleeve and the sliding table 7 must be readjusted so that the scanning light spot produced by the scanning head 20 is guided along a path centrally between a pair of adjacent raster network lines extending in a generally vertical direction.

Figure 3:
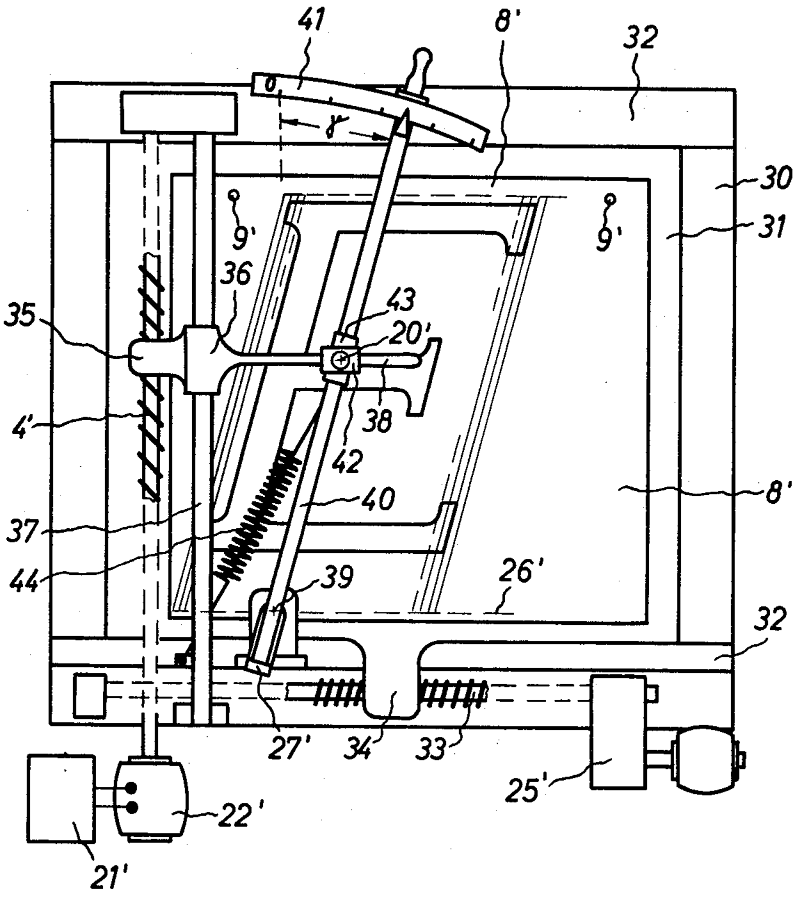
FIG. 3 is a diagrammatic plan view of a scanning apparatus constructed in accordance with another form of the present invention.

The raster network originals, as illustrated in FIGS. 1*a* and 1*b*, are advantageously executed so that all of the network lines inclined from the vertical at a selected italic angle pass through points which are located on a horizontal base line or scale line. The distances between the points on that scale line, through which the generally vertically extending or inclined network lines pass, are equal and correspond to the widths of the picture lines. Basically, each horizontal line of the raster field may be selected as a scale line. However, it is advantageous to select the lower horizontal line or base line 26, as illustrated in FIG. 3, of the raster field or network as a scale line. The base line 26 also forms the lower edge of the character point field and a starting line for the scanning operation.

In order to achieve efficient operation of the apparatus, it is desirable at the start position of the picture line scanning operation, that the axis of the hinge 14 and the pivot axis of the pivotal guide rod or rail 11 are superposed. The starting position of the picture scanning operation is selected to be at a position wherein the sliding table 7 together with the original card 8 is at its uppermost position and toward the right, and the starting line 26 is disposed exactly below the scanning head 20. When that requirement is fulfilled then the sliding table 7, together with the original card 8, is not displaced in a horizontal direction when the guide rail or rod 11 is pivoted about the pivot axis to adjust the angle to correspond to that of the angle of inclination of the italic character contained on the original card 8. Thus, once the length of the connecting arm 15 and the adjustable flap 16 are adjusted, that adjustment, if made in accordance with the requirements stated hereinabove, is sufficient for all further angular adjustments of the guide rail or rod 11.

In order to permit positioning of the hinge axis 14 coaxially of the pivot axis formed by the pivot pin 10, the guide rail 11 is supported on one leg of an L-shaped, angle bracket 27, as illustrated in FIG. 2*a*.

A second embodiment of the present invention, as illustrated in FIG. 3, differs from that previously described in that the scanning head 20' executes an inclined or canted movement having both vertical and horizontal components when scanning in a generally vertical direction. Components and elements of this embodiment of the present invention which are similar in configuration and function to those previously described are identified with like reference numerals to which a prime has been added. One advantage of this embodiment over that described hereinabove, consist in that the amount of the movement is slight. On the other hand, since the scanning head 20' is moved, it is necessary to feed a current to that movable component, thereby requiring care in the manner in which the electrical connections are made.

The original card 8' is affixed to a sliding table 31, which slides in a pair of parallel rails 32, 32 supported on an apparatus bench 30. An offset arm 34 has an appropriately formed through bore receiving the screw shaft 33. Drive means 25 rotate the screw shaft 33 in a manner to horizontally move the sliding table 31 and thus the original card 8' in the horizontal direction by small increments after each consecutive scanning cycle is completed. A motor 22', controlled by switching means 21', rotates the screw 4' in alternating directions for moving a slidable head 36 along a vertically disposed, fixed guide rail 37 in a vertically upward direction and back again. The slidable head 36 is interconnected with the screw shaft by a hub 35 having an appropriately formed through bore for receiving the course pitch screw shaft 4'. A side or connecting arm 38 extending horizontally across the table and toward the right moves with the slidable head 36.

A guide rail 40 mounted on the angle bracket 27' for pivotal movement about the pivot axis 39 guides the movement of the scanning head 20'. The guide rod 40 may be pivoted toward the right between a zero position wherein the rod extends parallel to the guide rail or rod 37 and to an angle roughly 30°. The angle of inclination of the pivotal guide rod 40 may be read on the arcuate scale 41 which is divided into increments corresponding to angular displacements identified thereon.

A connecting member includes a pair of sleeves 42 and 43 interconnected by a hinge pin having an axis extending perpendicularly of the respective axes of the sleeves. The connecting arm 38 and the guide rod 40 are respectively received within the sleeves 42 and 43 for sliding movement therewithin. As the slidable head 36 reciprocates in a vertical direction along the guide rod 38, the joined sleeves 42 and 43 move along the inclined path formed by the pivotal guide rod 40. The path of movement of the sleeves 42 and 43, and thus the scanning head 40, has a vertical component determined by the rotation of the screw 4 and also has a horizontal component dependent upon the inclination of the pivotal guide rod 40. The scanning head 20' is carried on a lower side of the sleeve 43 and scans the character original card in a manner to collect and store data for later retrieval to reproduce the character or letter contained on the card.

A flexible conduit 44 directs signals or impulses from the scanning head to an appropriate means for storing the information or data. At the completion of each reciprocal movement or scanning cycle, the screw shaft 33 is rotated through a small angle by the switching means 25' to horizontally displace the table 31 a distance equal to a picture line width, thereby positioning the scanning head for initiation of a subsequent scanning cycle.

Also, in a manner similar to that of the first embodiment, the pivoted guide rod 40 is mounted on an L-shaped bracket 27' so that the pivot axis 39 may be located in alignment with the base line 26' of the raster field so that the scanning head may be positioned over the base line.

Although those versed in the art might suggest various minor modifications, it should be understood that we wish to embody within the scope of the patent warranted hereon all such modifications as reasonably and properly come within the scope of our contribution to the art.

We claim as our invention:

1. An apparatus for determining data from a character original card containing an italic character, wherein the data is to be utilized for setting italic characters by electronic photo-typesetting devices, comprising:

a first table mounted for reciprocating, sliding movement in a direction vertically of the character original card;

drive means for reciprocating said first table;

a second table having the character original card affixed thereto and being mounted on said first table for reciprocating, sliding movement in directions horizontally of the character original card;

guide means for guiding the movement of said second table and including a guide rail mounted for pivotal movement about a pivot axis extending perpendicularly of a plane containing the original card and form a zero position wherein the rail is disposed parallel to the vertical direction to an angle corresponding to a maximum inclination of the italic characters, a sleeve mounted on said guide rail for sliding movement axially therealong, and means interconnecting said sleeve and said second table and being hinged to said sleeve for pivotal movement about a pivot axis extending perpendicularly of the plane containing the character original card; and means forming a scanning head adapted for measuring light and dark markings on the character original card, said scanning head being mounted over said second table and mOvable in a horizontal direction relative to the original card, whereby as said drive means reciprocates said first table vertically of the character original card, said second table moves in the vertical direction with said first table and simultaneously in a horizontal direction by a proportional amount dependent upon the angular inclination of said guide rail from the vertical.

2. An apparatus as defined in claim 1 and further characterized by second drive means horizontally displacing said scanning head an incremental distance in the horizontal direction at the completion of each reciprocal, scanning cycle movement of said second table.

3. An apparatus as defined in claim 1 wherein the character original card has a base, scale line forming a lower edge of the character raster field, and further characterized by said sleeve being disposed on said guide rail at a position so that the pivot axis of said guide rail is coaxial of the hinge axis when the scanning head is located in alignment with the scale line.

4. An apparatus for determining data from a character original card containing an italic character, wherein the data is to be utilized for setting italic characters by electronic photo-typesetting devices, comprising:

means forming a table having the character original card mounted thereon and being mounted for sliding movement in a direction horizontally of the character original card;

means forming a scanning head adapted for measuring light and dark markings on the card to the original card; and guide means mounting said scanning head and guiding movement thereof along a path inclined from a vertical direction of the card and extending substantially parallel to the inclination of an italic character contained on the card;

drive means reciprocally moving said scanning head along the guided path and horizontally moving said slidable table an incremental distance at the completion of each reciprocating scanning cycle.

5. An apparatus according to claim 4 and further characterized by:

said guide means comprising a first, fixed guide rail extending vertically of the original card, a second guide rail mounted for pivotal movement about a pivot axis extending perpendicularly of a plane containing the original card and being pivotal from a zero position wherein said second guide rail extends parallel to said vertical guide rail and to an inclined position wherein said second guide rail is disposed at an angle inclined from the vertical by an angle equal to the maximum possible inclination of an italic character contained on the original card, means interconnecting said fixed guide rail and said pivotal guide rail and including a head portion mounted for sliding movement coaxially of said fixed guide rail, a connecting arm having one end portion attached to said sliding head and extending horizontally of the original card, and a pair of sleeve members hinged together for pivotal movement about an axis extending perpendicularly to the plane containing the card and respectively being mounted on said arm and said pivotal guide rail for sliding movement therealong.

6. An apparatus as defined in claim 4, wherein the character original card has a base, scale line thereon, and further characterized by said pair of sleeves being disposed on said pivotal guide rail at a position so that the hinge axis extends coaxially of said guide rail pivot axis when the scanning head is located in alignment with the scale line.

* * * * *